Figure 1:
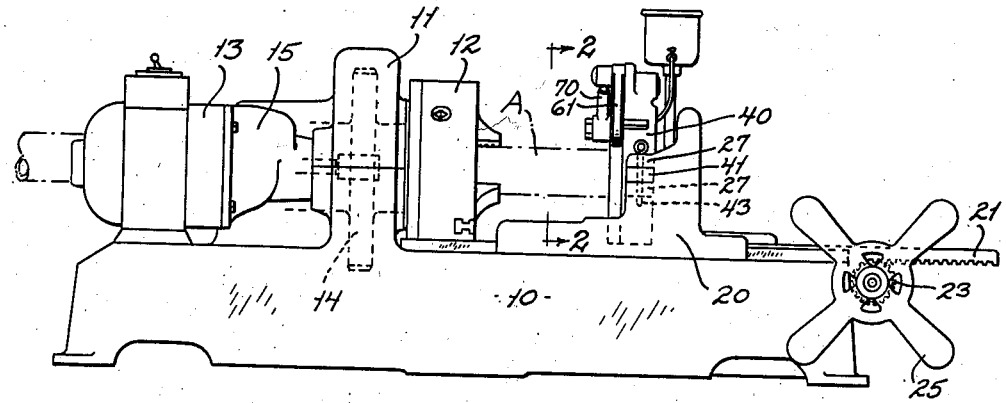

Dec. 16, 1941.   R. B. PEALER   2,266,508
THREAD CUTTING DEVICE
Filed June 28, 1940

INVENTOR.
BY Robert B. Pealer

Patented Dec. 16, 1941

2,266,508

UNITED STATES PATENT OFFICE 2,266,508

THREAD CUTTING DEVICE

Robert B. Pealer, Parkman, Ohio, assignor to Beaver Pipe Tools, Inc., Warren, Ohio, a corporation of Ohio Application June 28, 1940, Serial No. 343,004

4 Claims. (Cl. 10—96)

This invention relates to a power machine for cutting threads on pipes or bolts and is of the type wherein the pipe or bolt to be threaded is mounted in a chuck rotated by power, and the thread cutting is effected by chasers mounted in a slidable head and forming their own lead after the cutting has started.

My prior Patent No. 1,947,874 shows a thread cutting machine wherein chasers are mounted in a head and shifted in and out radially to set the chaser for different sizes of pipe, by turning a cam having a scroll connection with the chasers. Such cam after being set for the proper size of pipe is operated by a lever and crank mechanism to position the chasers simultaneously for threading or to withdraw them to free the pipe after the threading is completed.

The present application is in the nature of a simplification of the construction shown in the patent mentioned and is designed to make the action more certain, to reduce the chance of the chasers getting out of adjustment, and to enable the device to be more cheaply constructed.

Briefly, my invention provides an operating mechanism for the set of chasers, which is normally non-adjustable, but movable merely to in and out position. At the same time, provision is made whereby, at a little trouble, the user may make an adjustment for cutting a thread which is slightly off the standard, by setting the chasers of the unit slightly closer together or slightly farther apart than normal. This adjustment is not sufficient to enable the threading of different standard sizes of pipe, but merely provides for those occasional instances where it is necessary to cut a thread which does not conform to the standard.

My invention is illustrated in the drawing hereof and is hereinafter more fully explained, and the essential and novel features are summarized in the claims.

Figures 2, 3:
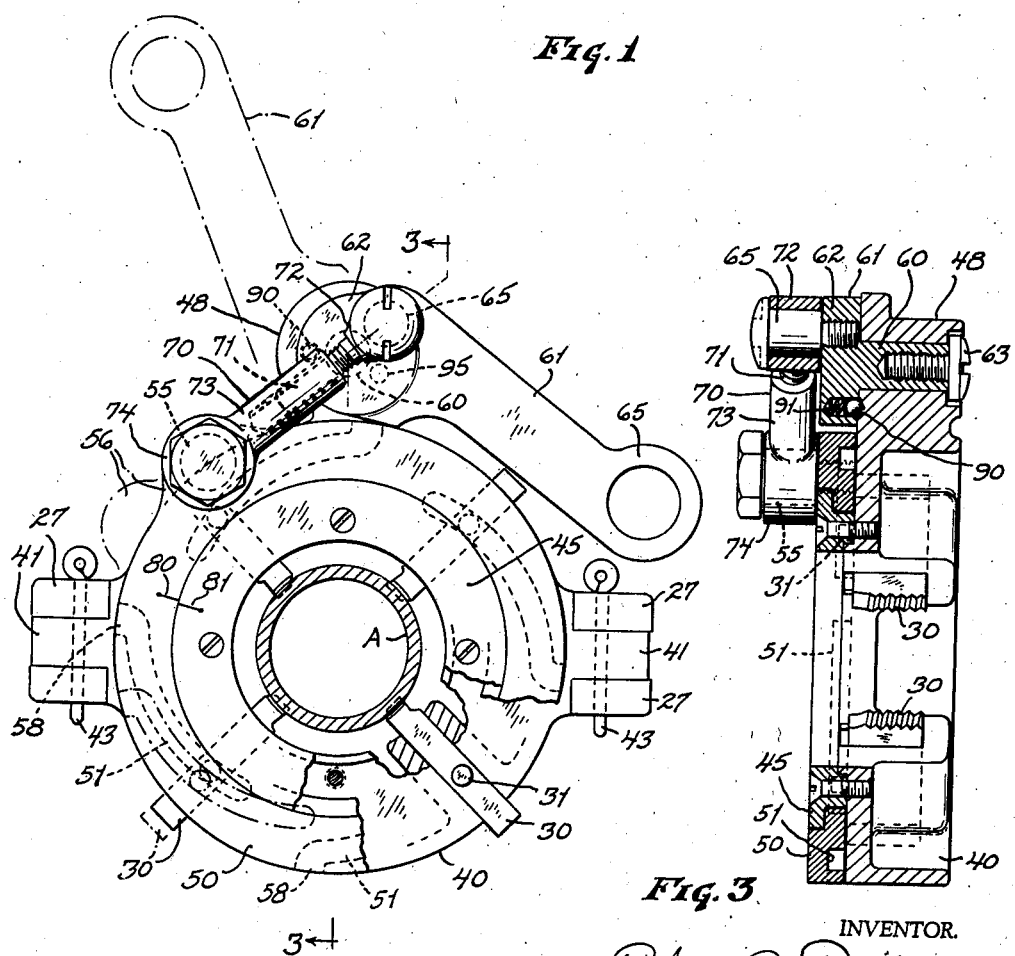

In the drawing, Fig. 1 is a side elevation of a power machine embodying my invention; Fig. 2 is a vertical transverse section on a larger scale, looking at the face of the threading head, as indicated by the line 2—2 on Fig. 1; Fig. 3 is a substantially vertical section through the cutting head in offset plane indicated by the line 3—3 on Fig. 2.

As shown in Fig. 1, 10 indicates a suitable bed having a standard 11 in which is mounted the barrel of a rotatable chuck 12. This chuck 12 is driven by a motor 13 mounted on the bed and connected with the chuck barrel by suitable reduction gearing indicated at 14. There may be further reduction gearing (not shown) within the motor casing 15 connecting the armature shaft with the pinion shown in dotted lines in the housing 11.

Mounted on the bed 10, is a shiftable carriage 20 shown as having a rack 21 connected with a pinion 23 on a cross shaft terminating in an operating handle 25.

As shown in Figs. 2 and 3, the chasers 30 are radially mounted in suitable ways in a ring-like head 40, having ears 41 which lie between spaced lugs 27 on the carriage. Suitable pins 43 may lock the parts together when desired for use as shown in Fig. 2, but allow a ready removal of the head whenever desired to substitute a head carrying different size chasers for cutting a different size of pipe.

To position the chasers and hold them effectively either in their active or their withdrawn position, I provide a cam plate 50 which is rotatably mounted on the head by means of the overhanging confining ring 45 secured to the head. This cam plate is provided on its inner side with scroll grooves 51 which are adapted to receive pins 31 on the chasers 30.

Formed on the upper portion of the chaser head is a boss 48, in which is journalled a subshaft 60 projecting from a lever arm 61 which adjacent the shaft is preferably formed into a disc-like portion 62 at the front of the boss. A suitable screw 63 with an overhanging head screws into the rear end of the shaft 60, whereby the shaft is retained in the boss. The lever arm 61 is shown as terminating in a ring-like finger portion 65. The lever with its disc-like hub-portion and the shaft are preferably one integral piece.

The hub-portion 62 of the lever member is in effect a disc-crank, its pin indicated at 65 being screwed into the upper portion of the hub member. There is another pin 55 screwed into an ear 56 in the cam-plate 50, and these two pins are connected by a compound link 70, so that movement of the lever operates to shift the cam. The compound link 70 is composed of two members, namely a screw 71 with a head 72 having a transverse hole embracing the pin 65, and an internally threaded sleeve 73 terminating in a head 74 with a transverse hole embracing the pin 55. These pins are in effect cap-screws having heads overhanging the faces of the link heads. The screw 71 snugly engages the thread in the sleeve 73.

It will be seen that the mechanism provides a link pivotally connected to the cam and the operating lever, and normally acting as one integral piece. When this lever is in the normal or down position as shown in full lines in Fig. 2, the cam is in the position to hold the chasers in their active position. To free the chasers from the pipe, it is only necessary to pull the lever over into the nearly upright position shown in dotted lines in Fig. 2. This turns the cam sufficiently to withdraw the chasers from the pipe indicated at A, so that the latter may be withdrawn freely from the cutting head.

I have above described the normal operation of the device, there being merely two positions, namely; the active position of the chasers where they may cut the thread, and the withdrawn position where they may free the pipe. The withdrawn position, however, is not sufficient to bring the open ends 58 of the cam grooves into registration with the pins 31 of the chasers so that the chasers could be withdrawn from the machine. When the machine is being assembled, the chasers are put in place, their pins passing through the open ends 58 of the cam groove and then when the compound link 70 is put in place with proper relative adjustment of its two parts for the standard, and is secured by the cap-screws 65 and 55, the chasers are effectively retained in the machine.

To remove a worn or broken chaser, the operator removes the cap screw 55 connecting the compound link with the cam plate, then shifts the cam plate manually until the open ends of the grooves register with the chaser pins. This allows the removal of the chasers.

The disconnection of the cap screw 55 also enables adjustment to be made in the length of the compound link, to change the setting of the chasers a slight distance either way from the standard as desired. That is to say, when the cap screw 55 has been removed, the sleeve member 73 may be given one or more turns in either direction to lengthen or shorten the compound link, and then when the cap screw 55 is replaced, the setting will be out of the standard in one direction or the other.

Suitable radial marks 80 and 81, Fig. 2, on the cam plate 50 and the locking plate 45 respectively, indicate the amount the setting is out of adjustment. For the purpose of illustration, the device is shown in Fig. 2 as set for cutting to a slightly smaller diameter than the standard. In normal operation, however, the two lines 80 and 81 will be in exact registration.

It will be noted from Fig. 2 that I have made the head of the screw 65 of a form not adapted for an ordinary wrench, in contradistinction to the head of the larger cap-screw 55. Accordingly, it will be the screw 55 which is removed by an ordinary wrench operation. This screw is larger so that there will be less chance of wear and looseness resulting from its removal and replacement.

If desired, I may provide a suitable frictional detent device to prevent inadvertent movement of the operating lever 61 from either its active or inactive position. This device may conveniently be a ball 90 backed by a spring 91 as indicated in Fig. 3. Here a recess is made in the lever-hub 62, and this recess is occupied by the compression spring and ball which latter is adapted in one position of the handle to occupy one depression in the boss 48, as shown in Fig. 3, and in the other position to occupy another depression as indicated by 95 in Fig. 2.

I claim:

1. In a machine of the character described, the combination of a head, chasers carried thereby, a cam plate mounted on the head and connected with the chasers for moving the chasers in and out, operating mechanism for the cam plate comprising a compound link and a manual lever to which it is pivoted, one end of said operating mechanism being pivoted to the head and the other end to the cam plate, the pivot pins of said link being transverse to the axial length of the link whereby the link is non-adjustable as to length while both its ends are thus attached, but adjustable as to length when one end is disconnected.

2. In a machine of the character described, the combination of a ring-like head, a set of chasers slidably mounted therein, a cam plate mounted on the head having scroll connections with the chasers whereby they may be shifted in and out as the cam plate is given a partial rotation, a lever pivotally mounted on the head, a compound link adapted to connect the lever with the cam plate, said link comprising an internally threaded sleeve with a head and an externally threaded screw with a head, the screw occupying the sleeve, each of said heads having an opening through it transversely of the length of the head, and pins occupying the respective openings and connected respectively to an eccentric region of the lever and to the cam plate and prohibiting relative rotation of the screw and sleeve, whereby change in the length of the link is impossible until one of the pins is removed.

3. In a machine of the character described, the combination of a ring-like head, a set of chasers slidably mounted therein, a cam plate mounted on the head and having scroll connections with the chasers whereby they may be shifted in and out as the cam plate is given a partial rotation, a lever pivotally mounted on the head, a link comprising an internally threaded sleeve with a head and an externally threaded screw with a head, the screw occupying the sleeve, each of said heads having an opening through it transverse of the axis of the threaded portion, and pins occupying said openings and threaded at their inner ends into the lever and cam respectively and prohibiting relative rotation of the screw and sleeve, whereby change in the length of the link is impossible until one of the pins is removed, said pins having heads at their outer ends overlapping the heads on the compound link, one of said pin-heads having an angular form suitable for wrench application.

4. In a machine of the character described, the combination of a frame, a set of chasers slidably mounted therein, a cam plate rotatively mounted on the frame and having scroll connections with the chasers whereby they may be shifted in and out as the cam plate is given a partial rotation, a lever pivotally mounted on the frame by means of a stud projecting from one side of the lever, a compound link comprising an internally threaded sleeve with a head rigid thereon and an externally threaded screw with a head rigid thereon, the screw occupying the sleeve, each of said heads having an opening through it transverse of the axis of its helical thread, one of said heads lying against that side of the lever which is opposite said stud and the other head lying against the cam plate, and headed screws having their shanks passing through said openings and screwing into the lever and cam plate respectively, and prohibiting relative rotation of the screw and sleeve, whereby change in the length of the link is impossible until one of the pins is removed.

ROBERT B. PEALER.